(12) United States Patent
Hartog et al.

(10) Patent No.: US 7,304,725 B2
(45) Date of Patent: Dec. 4, 2007

(54) OPTICAL TIME DOMAIN REFLECTOMETRY

(75) Inventors: Arthur H. Hartog, Southampton (GB); Peter C. Wait, Salisbury (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 408 days.

(21) Appl. No.: 10/502,616

(22) PCT Filed: Jan. 30, 2003

(86) PCT No.: PCT/GB03/00385

§ 371 (c)(1),
(2), (4) Date: Jul. 26, 2004

(87) PCT Pub. No.: WO03/065619

PCT Pub. Date: Aug. 7, 2003

(65) Prior Publication Data

US 2005/0117830 A1    Jun. 2, 2005

(30) Foreign Application Priority Data

Jan. 30, 2002   (GB)   .................. 0202159.0

(51) Int. Cl.
*G01N 21/00*   (2006.01)

(52) U.S. Cl. .................................. 356/73.1
(58) Field of Classification Search ............ None
See application file for complete search history.

(56) References Cited

U.S. PATENT DOCUMENTS 5,991,479 A * 11/1999 Kleinerman ............ 385/31
6,526,208 B1 * 2/2003 King et al. ............ 385/123

* cited by examiner

*Primary Examiner*—Tu T Nguyen
(74) *Attorney, Agent, or Firm*—Henry L. Ehrlich; Bryan Galloway; Tim Curington

(57) ABSTRACT

An optical time domain reflectometry apparatus for sensing a parameter in a region of interest is characterized in that the optical fiber includes a first section into which optical radiation at the probe wavelength is launched and a second section deployed in the region of interest. The first section has a higher intensity threshold for the onset of non-linear effects than the second section. The source launches the optical radiation into the first section at an intensity lower than the non-linear effects intensity threshold of the first section but higher than the non-linear effects intensity threshold of the second section. The attenuation characteristics of the first section are chosen such that the intensity of the optical radiation at the probe wavelength that reaches the second section is below the threshold for the onset of non-linear effects of the second section.

7 Claims, 3 Drawing Sheets

OPTICAL TIME DOMAIN REFLECTOMETRY

RELATED APPLICATIONS

This application is a national stage filing of PCT International Application Number PCT/GB03/00385 filed on Jan. 30, 2003, which claims priority to Great Britain Application No. 0202159.0, filed Jan. 30, 2002. All of these patent applications are incorporated by reference herein in their entireties.

FIELD

The present invention relates to optical fibre sensors based on optical time-domain reflectometry (OTDR) in which a pulse or series of pulses is launched into the fibre and the signal is returned to the launching end and originates in reflected or scattered light in the fibre.

BACKGROUND

One example of such sensors is the Raman OTDR sensor from which temperature profiles can be determined from the intensity distribution of the backscatter signal measured as a function of time from launching, the probe pulse, or equivalently, distance along the fibre. OTDR technology is used very commonly in telecommunications for assessing the quality and integrity of optical fibre links. In this case, the link is defined by the requirements of the communications system and the OTDR must be designed to cope with the optical fibre system as specified. In the application of OTDR for sensors, however, there is far more flexibility to select the optical fibre system and its interconnection to suit the requirement of the OTDR-sensor designer.

It is known that the performance of OTDR sensors is limited by the power that can be launched into the fibre, owing to the existence of non-linear optical effects. The origin of these non-linear optical effects varies depending upon the characteristics of the probe pulse. For short pulses having a broad spectral width, the dominant effect is usually stimulated Raman scattering (SRS). For longer pulses, with narrower spectral widths, the dominant effect is generally stimulated Brillouin scattering (SBS). For short narrowband pulses, the limiting effect is generally self-phase modulation (SPM), in those cases where the pulse is required to maintain a narrow spectral width. A more detailed explanation of these effects may be found in the literature, for example G. P. Agrawal "Nonlinear fiber" optics Academic Press 1995 ISBN 0-12-045142-5.

The limited power which can be launched into an optical fibre for OTDR-type measurements is a serious limitation on the performance of these systems. The signals received for interrogation pulse in these systems are typically very weak, typically only a few photons are returned in the intended signals from the most remote points of interest in the system. Since the signal received is proportional to the power of the probe pulse, it is clear that an ability to increase the power in the probe pulse will result in a higher performance. Alternatively, if the amount of power that is returned for a given launched power could be increased, then the signal-to-noise ratio could be increased and thus the measurement quality improved. Finally, it should be realised that OTDR measurements are usually averaged over a large number of measurements in order to improve the signal to noise ratio, the latter quantity improving as the square root of the number of measurements averaged. Thus an improvement in the signal-to-noise ratio resulting from a higher power launched can be used to obtain faster update times on the measurement.

It is therefore desirable to provide methods and apparatus to improve the signal-to-noise ratio in OTDR measurements from the section of fibre which is of interest, where this section is separated from the instrumentation by a finite distance. It is frequently the case that the most important section is at the most remote end of the fibre. Whilst the closer sections of fibre may also require to be measured, the present invention concentrates on the improvement of the measurement quality of a remote section of fibre.

The main reason for concentrating on improving measurement at the remote end of the fibre is that this is where the attenuation suffered by the probe pulse in the outbound direction and the signals in the return direction are the highest. There are, moreover, applications where the final section is of primary interest and where the data quality at closer distances is less important. One example of such applications is the measurement of temperature profiles in sub-sea oil wells. In this case, it is important to know the temperature of the fluids flowing in the well to, typically, 0.1° C. However, the equipment is typically located on a platform which is sited some distance away from the well, the well being connected to the platform by a sub-sea flowline which lies on (or is buried within) the sea bed, a riser taking the oil from the flowline up to the platform. The horizontal distance between the platform and the sub-sea well head is known as the "step-out" distance. In a typical example of wells being planned for deep water oil production, the well might extend up to 10 km below the seabed. The step-out distance could be as high as 20-30 km and the water depth can reach 2000 m and may in future exceed this value. In this example, it is the section of optical fibre in the well, the final 10 km, which is important. The fibre which connects the platform with the well head is of lesser importance; it may convey information about blockages in the flowline, but the temperature resolution required for the purposes of flow assurance in the flowline is far less demanding than that required in the well.

In order to provide further background to the invention, the relationship between the maximum power which can be launched in the fibre and the resulting backscatter power will be discussed.

The resolution of the measurand (e.g. temperature) of OTDR-type sensors, such as the Raman OTDR or Brillouin OTDR is generally determined by the signal-to-noise ratio of the backscattered signal. A further discussion of this point may be found in the textbook "Optical Fibre Sensor Technology" edited by Grattan and Meggit (Chapman & Hall, London, 1995, ISBN 0 412 59210 X) and especially in the Chapter on distributed fibre optic sensors. To summarise, the signal returned in such a sensor is proportional to probe pulse energy. In order to increase the pulse energy, either the pulse duration or the pulse power can be increased. In the former case, the spatial resolution (i.e. the ability of the sensor to distinguish closely-spaced features on the profile of the measurand) is degraded. In the later case, the peak power is limited by non-linear effects which convert the probe pulse to different wavelengths from that launched, when the power is increased above certain limits.

In general, it is the intensity of the optical power in the fibre which defines the onset of non-linear effects. By intensity, it is meant the ratio of the optical power launched divided by the area over which this power is spread. Since the optical power is not uniform, an "effective" area is usually defined as follows $$A_{eff} = 2\pi \frac{\left[\int_0^\infty r\psi(r)^2 \, dr\right]^2}{\int_0^\infty r\psi(r)^4 \, dr}$$

Where φ(r) represents the electric field distribution as a function of the radial coordinate r. The non-linear effects scale inversely with Aeff. It follows that for a given limit at which the non-linear effects become unacceptable, the power which can be launched into the fibre increases in proportion to Aeff. It turns out however, that the backscatter factor, i.e. the ratio of the backscatter signal power to the energy of the probe pulse, is inversely proportional to Aeff. It follows that if the fibre design is changed to increase Aeff, more power can be launched into the fibre, but the fraction of the pulse energy which is converted into a backscatter signal is reduced roughly in proportion to the increase in Aeff, resulting in backscatter signal which is unchanged. Whilst the dopants used to modify the refractive index cause the relationship to deviate somewhat from proportionality with Aeff, the above discussion remains valid, at least approximately. Some of the effects scale further still. For example, for small additions of GeO2 to silica, the core index increases proportionately to the molar concentration of GeO2, leading to an effective area which is reduced as the inverse square of the GeO2 concentration. However, the threshold for stimulated Raman scattering is reduced in a similar proportion because the Raman gain cross section and the spontaneous Raman scattering (from which the stimulated Raman scattering emerges) are both proportional to GeO2 concentration.

The previous paragraph uses terms that relate to single mode fibres, however, it will be understood that the same principles apply to multimode fibres.

SUMMARY

According to a first aspect of the present invention there is provided an optical time domain reflectometry apparatus, for sensing a parameter to be measured in a region of interest, which apparatus comprises: an optical fibre; source means operable to launch optical radiation into the optical fibre at a probe wavelength; and detection means operable to produce electrical output signals in response to optical radiation backscattered from the optical fibres characterised in that the optical fibre comprises a first section, into which the said optical radiation at the probe wavelength is launched, and a second section deployed in the region of interest, the said first section having a higher intensity threshold for the onset of non-linear effects than the said second section, the said source means being operable to launch optical radiation at the probe wavelength into the said first section at an intensity lower than the non-linear effects intensity threshold of the said first section but higher than the non-linear effects intensity threshold of the second section, the attenuation characteristics of the first section being such that the intensity of the optical radiation at the probe wavelength reaching the second section is below the threshold for the onset of non-linear effects of the said second section.

According to the first aspect of the present invention there is also provided an optical time domain reflectometry method of sensing a parameter to be measured in a region of interest, which method comprises launching optical radiation at a probe wavelength into an optical fibre and producing electrical output signals in response to optical radiation backscattered from the optical fibre, characterised in that the optical fibre comprises first and second sections, the second section having a lower intensity threshold for the onset of non-linear effects than the first section, the said second section being deployed in the region of interest and optical radiation at the probe wavelength being launched into the said first section at an intensity lower than the non-linear effects intensity threshold of the first section but higher than the non-linear effects intensity threshold of the second section, the attenuation characteristics of the said first section being chosen so that the intensity of the optical radiation at the probe wavelength reaching the second section is below that of the non-linear effects intensity threshold of the said second section.

According to a second aspect of the present invention there is provided an optical time domain reflectometry apparatus, for sensing a parameter to be measured in a region of interest, which apparatus comprises: an optical fibre; source means operable to launch optical radiation into the optical fibres at a probe wavelength having a preselected intensity; and detection means operable to produce electrical output signals in response to optical radiation backscattered from the optical fibre; characterised in that the optical fibre comprises a first section, into which optical radiation at the said probe wavelength is launched, and a second section deployed in the region of interest, there being a remote amplifier arranged between the first and second sections which is operable to compensate for attenuation losses in the intensity of the probe wavelength in the said first section.

According to the second aspect of the present invention there is also provided an optical time domain reflectometry method of sensing a parameter to be measured in the region of interest, which method comprises launching optical radiation at a probe wavelength with a preselected intensity into an optical fibre and producing electrical output signals in response to optical radiation backscattered from the optical fibre, characterised in that the optical fibre comprises first and second sections connected together by a remote amplifier, the gain of the amplifier being selected so as to compensate for attenuation losses in the probe wavelength in the first section.

According to a third aspect of the present invention there is provided optical time domain reflectometry apparatus, for sensing a parameter to be measured in a region of interest, which apparatus comprises an optical fibre; source means operable to launch optical radiation into the optical fibre at a probe wavelength; and detection means operable to produce electrical output signals in response to optical radiation backscattered from the optical fibre; characterised in that the optical fibre comprises a first section, into which the said optical radiation at the probe wavelength is launched, and a second section deployed in the region of interest, the first section being optically connected to the second section at a location remote from the source means and comprising first and second fibres, the first fibre being arranged so as to convey optical radiation at the probe wavelength towards the second section and the second fibre being arranged so as to convey the backscattered optical radiation returned from the second section to the detecting means.

BRIEF DESCRIPTION OF THE DRAWINGS

Reference will now be made, by way of example, to the accompanying drawings, in which.

DETAILED DESCRIPTION

Figure 1:
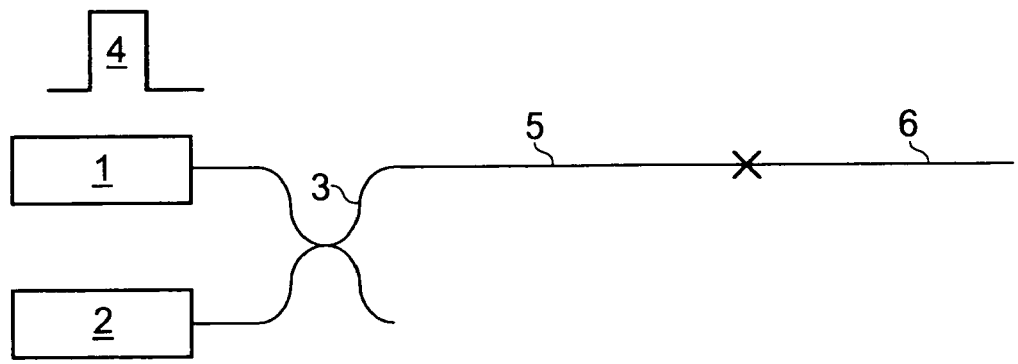
FIG. 1 shows OTDR apparatus according to a first embodiment of a first aspect of the present invention.

According to an embodiment of a first aspect of the invention, a method can be provided in which the backscatter power from the remote end of an optical fibre can be increased, whilst allowing the power launched into the fibre to remain below non-linear limits. In the method, the optical fibre is made up of at least two sections of fibre, such that the numerical aperture increases monotonically with increasing distance from the instrumentation. This method is illustrated in FIG. 1, where an OTDR backscatter measuring apparatus, represented schematically by a source 1, detector 2 and coupler 3, launches high power pulses 4 into a first fibre 5. The intensity of pulses 4 is selected to be below the threshold for the non-linear effects of relevance (depending on the application of the system and its design, the limiting effects could be SRS, SBS, SPM or others). The section of primary interest is a second fibre 6 which is connected to fibre 5 at a distance Lf. Fibre 5 is selected so as to have a high threshold for non-linear effects (and therefore, a low backscatter factor) and fibre 6 a significantly lower threshold (and thus a high backscatter factor), the relationship between the distance Lf and the effective areas of fibres 5 and 6 being so arranged that the power propagating in fibre 6 has been attenuated by its propagation through fibre 5 and that it is below the non-linear threshold in fibre 6 even though it would be above that threshold in the event that it were launched directly into fibre 6 without passing through fibre 5. Thus the attenuation of fibre 5 is used to bring the intensity of pulses 4 down to a level that can be accepted by fibre 6 without non-linear effects. Since in certain applications the distance covered by fibre 5 is required in any case to reach the start of fibre 6, the benefits of this method can be substantial.

As an example of the benefit that can be gained from this method, the numerical aperture (a quantity which relates to the index-difference between core and cladding) of a long distance fibre is typically 0.12 and the corresponding mode-field diameter is of order 11.5 μm. However, for special applications, fibres having numerical apertures as high as 0.29 are available. Since the effective area is inversely proportional to the square of the numerical aperture, and the backscatter factor proportional to its square, it will be seen that, for the same launch power, substituting a fibre of higher numerical aperture at a distance where the probe power has fallen by a factor equal to at least the square of the ratio of the numerical apertures of the first and second fibres will result in an increase in the signal received by a square of said ratio. In the example given above, the improvement in the signal received is approximately a factor of 6.

It is usually the case that fibres having a large numerical aperture (small effective area) suffer from somewhat higher transmission losses than fibres having larger effective areas. The location of the junction between fibres 5 and 6 can therefore be optimised. Furthermore, it is generally desirable to arrange for the change in effective area to occur over several steps. The reasons for changing the properties of the fibre from large to small Aeff in several steps are that the splicing losses are typically lower and, furthermore, the length of highest loss (with the lowest Aeff) is thereby minimised. In the extreme example, the fibre properties would be tapered so that the losses attributable to the change in fibres properties would be zero since the changes would take place adiabatically and secondly the loss/Aeff relationship along the fibre can be optimised.

A method for selecting the relative lengths of each section, in a fibre consisting of sections of fibre having a progressively increasing numerical aperture, is described below.

Given a known ratio between the backscatter level in the ith and (i+1)th section, the splice loss between them and the attenuation per unit length of the (i+1)th section, then the optimum length for the (i+1)th section may be derived from the following considerations. The shorter the length of the (i+1)th section, the higher the backscatter returning from its remote end will be. However, if this section is very short, then the backscatter signal from the remote end of the previous section will be weaker than that from the end of the (i+1)th section. It follows that the optimum length of the (i+1)th section is given by:

$$Lopt_{i+1} = \frac{10 \cdot \log\left[\frac{B_{i+1}}{B_i} \cdot \frac{\alpha_{s_{i+1}}}{\alpha_{s_i}}\right] - S_{i,i+1}}{\alpha_{i+1}}$$

where B is the backscatter capture fraction (i.e. that proportion of the scattered light which is re-captured by the waveguide in the return direction), αs is the scattering loss for the spectral component used in the measurement, S represents the splicing loss between section i and section i+1 and α is the total loss of the section. In all cases the values which vary between sections are identified by the index of the section of interest. In this case, α is expressed in dB/km, S in dB and αs is expressed in linear units (as a fraction of the forward travelling light which is scattered per unit length). The resultant optimal length for the (i+1)th section is subject to the following assumptions: (1) that the resulting length is less than the length of the critical length of interest to be measured with the highest precision: if this condition is not met, then the optimum length is simply that of the final section of interest; and (2) that the power remaining in the probe pulse at the junction is below the onset of the non-linear effect which limits the system performance. If this condition is not met, then the junction between the two sections is moved further towards the remote end of the fibre. Moving the junction has two effects, namely to reduce the power in the final section when it is reached and also to increase the threshold for non-linear effects in that final section, since the threshold is dependent on the length of the final section.

Where more than two sections of differing fibre exist, the above procedure is repeated for all the junctions between fibre sections, starting at the most remote.

The above-described methods are entirely passive. However, similar benefits can be achieved using amplification means sited remotely from the instrumentation. According to a second aspect of the invention, the power from the remote sections of a fibre interrogated by an OTDR sensor can be increased by employing remote in-line optical amplification means to increase the power level in the final section and to amplify the signal returning from that section in the same amplifier. Although in the description below the amplifier is sited remotely and is preferably pumped remotely, a remote amplifier powered in the remote location from an electrical source (possibly driving a local pump source) is also possible.

A remotely pumped amplifier is a variant of optical amplifiers in which the pump power is transmitted along an optical fibre to the amplifier, which is thus electrically passive. Whilst remote amplifiers have been used extensively in telecommunications and in discrete sensor arrays (e.g. in time-domain interrogation of acoustic sensor arrays, U.S. Pat. No. 5,866,898) they have not to date been applied to OTDR-type sensors, especially not in temperature sensors based on Raman or Brillouin scattering. In the case of Raman scattering, the spectral width of the signal is extremely wide (of order 10-15 THz) which results in very high noise inputs from the amplifier. In the case of Brillouin scattering, it is necessary to filter the backscatter spectrum in order to gain any benefit from the technique. This may be why it has not been proposed to date.

An OTDR-type sensor embodying the second aspect of the present invention consists of at least a first section of fibre into which the pulses are launched, this first section being followed by at least a second section of fibre, the two sections being separated by an optical amplifier. The amplifier consists preferably of a section of fibre doped with a rare-earth ion which has the property of exhibiting gain at the probe and/or signal wavelengths when illuminated by light at an appropriate pump wavelength. In one preferred embodiment, the signal wavelengths are in the region from 1525 nm to 1580 nm and the amplifier consists of a length of single mode fibre doped with erbium ions. The amplifier is preferably pumped at a wavelength of about 1480 nm and preferably the pump light is transmitted along the same fibre as the probe and backscattered light. The erbium doped fibre amplifier is especially appropriate to the application envisaged in that the upper state-life-time of the Er ions is sufficient for the device to store significant amounts of energy and thus relatively low pump power can provide efficient amplification for the low fraction of the time (duty cycle) for which it is required.

Figure 2:
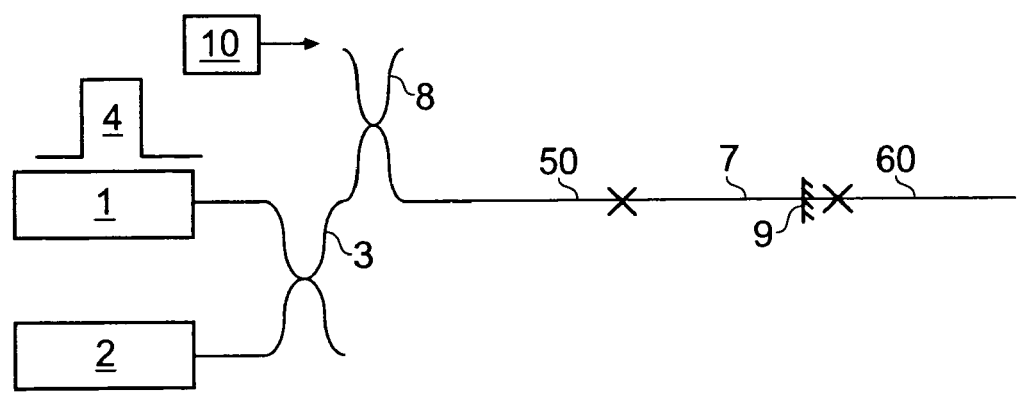
FIG. 2 shows OTDR apparatus according to a first embodiment of a second aspect of the present invention.

This configuration is illustrated in FIG. 2 in which a source 1 launches probe pulses 4 into a first section of fibre 50 through a directional coupler 3. At the end of section 5, a length of Erbium-doped fibre 7 is spliced in line with first fibre section 50 and then to a second section of fibre 60. A second, wavelength-selective, coupler 8 is used to launch pump light 10 into the fibre, coupler 8 being selected so as to transmit substantially all of the probe and backscatter signals unaffected and to couple into fibre 50 substantially all of the pump light which is at a different wavelength from the other signals (probe and return signals). The pump light travels along fibre 50 and is absorbed in part by amplifier fibre 7. Optionally a wavelength-selective reflector 9 may be added at the remote end of the amplifier fibre 7 to reflect any unabsorbed pump power back through the amplifier, thus improving the efficiency with which the pump power is used. Reflector 9 is designed to have minimal effect on the transmission of all signals other than the pump itself. It is preferably implemented as a fibre Bragg grating. It should be noted that in this embodiment, the amplifier serves to increase the level of both the probe pulses and of signals returning from section 60.

If the gain of the amplifier is adjusted to compensate for the losses in the first section 50, then the performance of the system will be similar to that of a system measuring just the final section 60 with, however, the following penalties: a) the noise figure of the amplifier will degrade the signal-to-noise ratio, b) the pules repetition frequency is limited by the total length of the fibre (sections 50+60) rather than the less restrictive limit dictated by section 60 along and c) the power which can be launched into the first section 50 is always less than would be the case if only the final section 60 were measured owing to the longer length available for the build up of new wavelengths in the probe pulse (a precursor to the full development of optical non-linearity).

In a preferred embodiment the power level of the probe launched into the first fibre section is significantly below the level at which non-linear effects occur in that section and the amplifier gain is selected in such a way that its gain is greater than the attenuation of the first section, and that the probe power emerging from the amplifier into the second section is close to the limit of the power which can be accepted by said second section as determined by the limitations of non-linear optical effects in said second section.

Whereas it may be intuitively expected that the probe power must preferably be maximised, operating an OTDR-type sensor as just described has the following benefits. Certain types of non-linear effects in optical fibres build up gradually along the fibre. This build-up is delayed by reducing the power launched into the fibre section. As a result, the probe power in the section beyond the amplifier can be adjusted to a higher level than would be the case if the power level in the section preceding the amplifier had been close to the limit for that section. This benefit is illustrated in the following example, which is specific to single mode fibre. It is assumed that the limitation on the power launched results from self-phase modulation. It is also assumed that the section of interest is the final 10 km of a 30 km fibre, with the amplifier being placed immediately before the final 10 km, i.e. at 20 km from the instrumentation. It is further assumed that the maximum acceptable spectral broadening due to SPM is 500 MHz. It is also supposed that the gain of the amplifier is set to offset the loss of the first section only, that the power at the launching of the first section is maximised. Under these conditions, the probe power must be limited to a power of order 140 mW for 14 ns Gaussian-shaped pulses In contrast, if only 50 mW were launched into the first section, then the amplifier gain could be adjusted to deliver 250 mW into the final fibre section, for a similar spectral broadening. Thus the design decision to limit the power in the first section allows a 78% increase in probe power in the section of importance. Similar benefits exist where the first limitation on power launched is due to stimulated Raman scattering. For example, where the gain of the remote amplifier is set to match the losses of the first section, then it is calculated that the maximum power which can be launched in order to keep the cumulative non-linear losses of the probe pulse below 0.3% (corresponding to 1° C. error for an intensity-based Brillouin system) is 0.9 W. However, if the power launched into the first section is restricted to significantly below 0.9 W, for example 0.1 W, then the amplifier gain can be adjusted to deliver 2 W into the second section for the same distortion level, i.e. an increase in the probe power in the section of fibre where it matters by a factor of more than 2.

A second benefit that is gained by operating the remote amplifier at a gain higher than is required to merely compensate for propagation losses in the first section applies to systems where the same amplifier is used for the signal returning from the second section. In this case, the stronger signal returning from the remote section of fibre can be arranged to eliminate the attenuation of further optical components in the receiving section of the opto-electronics and to dominate the noise of the pre-amplifying stage. Thus, an additional benefit equal to the sum (in logarithmic units) of the optical losses of the instrumentation prior to the next amplification stage plus the noise figure of that stage can be gained by reducing the probe power in the first section.

As a design example, it will be assumed that the preferred embodiment of an Erbium-doped fibre amplifier is adopted, which is remotely pumped with a 1480 nm laser, with the signals closely spaced near 1550 nm. Assuming 50 mW launched into a 20 km-long; first section and stepped up to 250 mW at the amplifier, and allowing 4.8 dB of propagation losses in the first section, then the total gain required is 9.8 dB. The average power illuminating the amplifier is 2.1 µW, in addition to which 4 nW of backscatter power is expected in the return direction from the second section. Under these conditions, a length of approximately 8 m of the fibre type HE980 (supplied by Lucent Technologies of New Jersey, USA) will be sufficient to provide the gain required. Less than 2 mW of pump power would be absorbed and with 5 mW received at the amplifier, the noise figure is calculated to be about 4 dB. At 1480 nm the fibre losses in the first section are expected to be of order 0.25-0.3 dB/km, and therefore, it would suffice to launch 20 mW into the first section to deliver 5 mW to the amplifier. Alternatively, with the probe launch power reduced to 25 mW, 15 dB of gain is usable, which would be accomplished by a 12 m section of the same fibre pumped by 10 mW of optical power at 1480 nm (assuming that an optional pump reflector is installed). In this latter example, the signal from the second section is returned to the start of the first section with a strength 10 times that with which it would have emerged from the second section, and only a 4 dB noise penalty. The increased signal will significantly reduce the impact of the noise of the following amplification stage in the system.

Figure 3A:
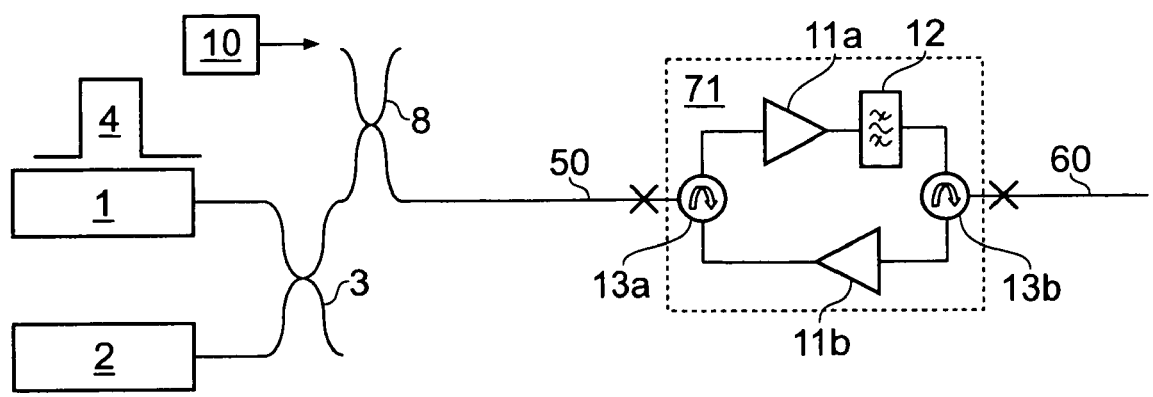
FIG. 3a shows OTDR apparatus according to a second embodiment of a second aspect of the present invention.

In certain circumstances, it may be desirable to perform certain optical functions remotely, such as filtering the probe signal prior to entering the final section. A filtering operation allows the effect of spurious light accompanying the probe pulse—such as broadening resulting from SPM in the first section—to be removed prior to the critical final section. In general, these functions must be applied to the probe pulse or the backscatter signal. In addition, it may be desirable to adjust the gain of a remote amplifier to be different for the probe pulses than for the signals returning from the second section. It may therefore be desirable to provide an optical sub-assembly sited remotely from the instrumentation and preceding a section of fibre which must be measured, in which the forward-travelling (probe) light is separated from the backward travelling light and processed prior to being launched into the final section of fibre. The light returning from the final section may also be processed (e.g. amplified) and returned to the instrumentation. The probe light travelling from the instrumentation to the sub-assembly may share the same fibre as the light returning from the sub-assembly. This arrangement is illustrated in FIG. 3a, in which a pair of circulators 13a, 13b have been used to separate the light on entering the sub-assembly 71, which includes amplifiers 11a and 11b and a filter 12, and to re-combine the light prior to leaving the sub-assembly. A circulator is a particularly efficient means of accomplishing this function, although a combination of directional couplers (to split the light) and isolators (to ensure unidirectional propagation) in the split paths is also possible. Depending on the specification of the splitting devices, it may be necessary to use pump by-pass couplers, which are similar to directional coupler 8 in that their wavelength selectivity allows the pump and other signals to be separated. For clarity these are not shown in FIG. 3a, but a more detailed view of the preferred arrangement for sub-assembly 71 is illustrated in FIG. 3b.

Figure 3B:
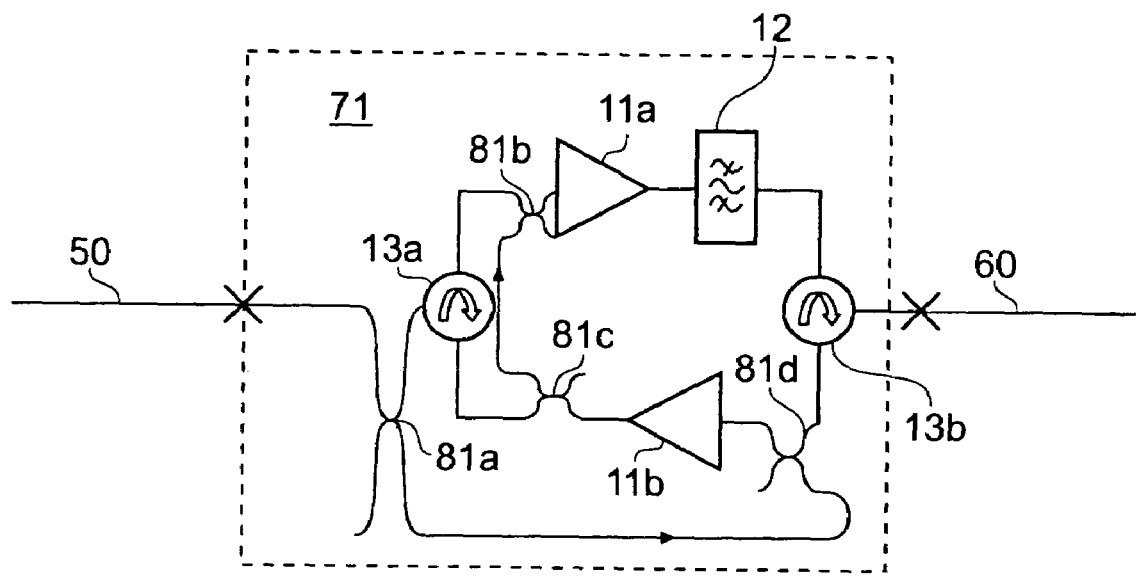
FIG. 3b shows part of the apparatus of FIG. 3a in more detail.

In FIG. 3b additional couplers 81a-d are shown. These serve to remove pump power fibre from the first section 50 immediately prior to the circulator 13a (these devices normally being unsuited to transmit both pump and signal) and re-launch the pump power into the amplifiers 11a, 11b as required. The pump power is routed along the path shown by the arrows, namely into one amplifier 11b (in this case the amplifier for the return signals, again the preferred option) and the remaining power then being removed from the signal path and then fed into the other amplifier 11a. Optionally, filter 12 can include a selectively reflective device which returns the residual pump power back through the amplifiers 11a, 11b in order to improve the efficiency of the pump usage.

The sensitivity of the losses of components in sub-assembly 71 must be carefully considered and it may be necessary carefully to scramble the polarisation of the light sent to and/or returned from the said sub-assembly.

Alternatively, it may be preferable to convey the forward travelling probe power and the signals returning from the final section along separate fibres. For example, the remote optical sub-assembly may be linked to the instrumentation by at least two optical fibres connected to different ports on the instrumentation, at least one of these fibres serving to convey the probe pulse from the instrumentation to the sub-assembly and at least one fibre carrying the backward signals returning from the section of fibre to be measured through the sub-assembly and back to the instrumentation. One or more additional fibres may be used to convey pump power to a remote amplifier sited in the sub-assembly.

Whilst this arrangement requires two fibres in the cable prior to the remote sub-assembly (and thus adds cost) it eliminates the need for one set of splitting components and allows the remaining combining device to be extremely simple. It also allows for the fibre conveying the probe pulse to be optimised independently of that carrying the signals back to the instrumentation. Finally, it allows the pulse repetition frequency to be increased to reflect only the round trip propagation time in the final section, rather than along the entire distance from the instrumentation to the most remote end. As a result, the measurement time can, in the example of a 20 km step-out followed by a 10 km well—where only the well is to be measured—be reduced by a factor of approximately 3.

Figure 4A:
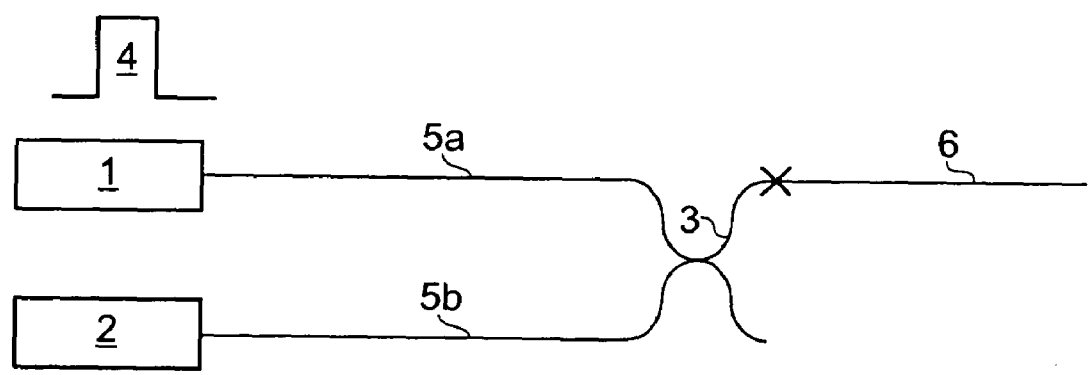
FIG. 4a shows OTDR apparatus according to a second embodiment of a second aspect of the present invention.
Figure 4B:
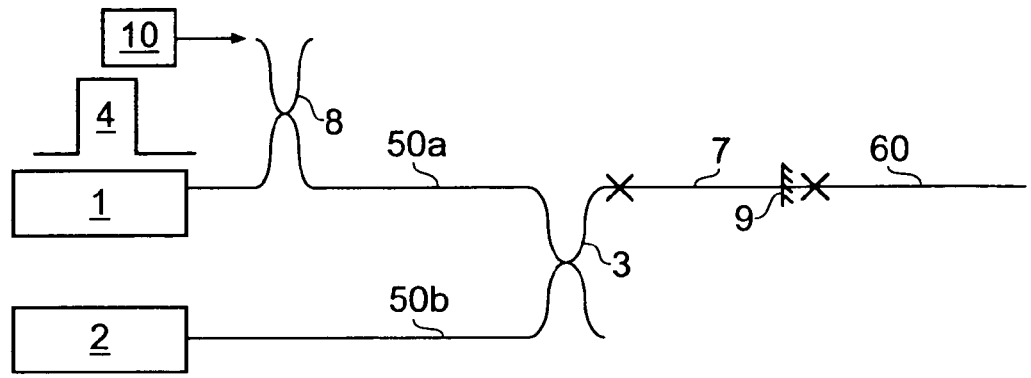
FIG. 4b shows OTDR apparatus according to a third embodiment of a second aspect of the present invention.
Figure 4C:
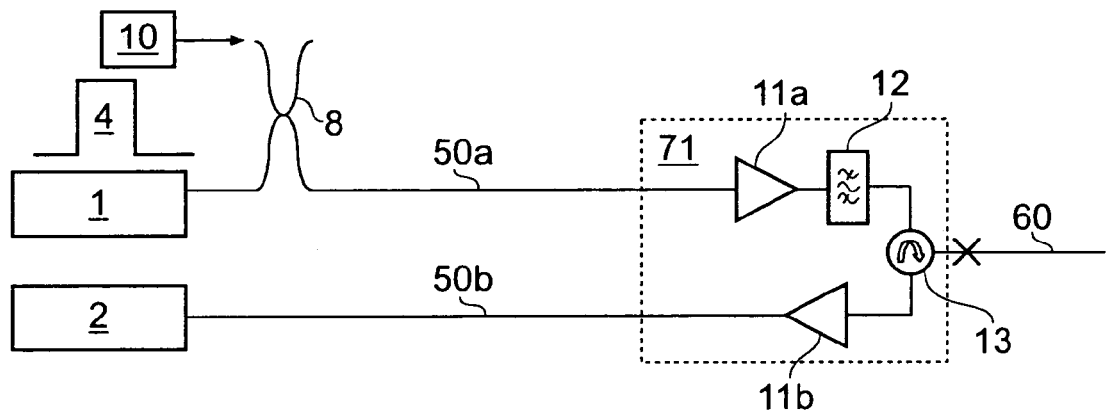
FIG. 4c shows OTDR apparatus according to a fourth embodiment of a second aspect of the present invention.

It will be clear that, although this arrangement is particularly advantageous when used in conjunction with the previously described aspects of the invention, as illustrated in FIGS. 4a-c below, the use of one fibre to transmit the probe pulse to a second section of fibre and of another fibre to transmit the backscattered signals from the second section of fibre to detecting means or the like could be advantageous regardless of whether methods embodying the first and second aspects of the present invention have been used to improve transmission along the second section of fibre.

FIG. 4a corresponds to the apparatus of FIG. 1, but differs in that interrogation pulses 4 emitted by source 1 are launched into a first fibre section 5a. Directional coupler 3 is now sited remotely, immediately prior to the region of interest in which section 6 is deployed. The signals returning from section 6 are routed through coupler 3 and back to the instrumentation through a separate fibre 5b. In accordance with the first aspect of the invention, the design of section 6 can be selected to exhibit a higher backscatter factor than that in section 5a.

FIG. 4b corresponds to the apparatus of FIG. 2, but like FIG. 4a differs in that the probe pulses are conveyed to the region of interest on a first fibre 50a and returned or a second fibre 50b, through a directional coupling device 3. The difference with respect to the arrangement of FIG. 4a is that an amplifying section 7 has been included between coupler 3 and fibre section 60. In this case, coupler 3 is designed to be wavelength selective, so that all of the pump power coupled into fibre 50a through coupler 8 and arriving at coupler 3 is directed into amplifying fibre section 7. The splitting ratio of coupler 3 at the signal and probe wavelengths may be selected to couple uneven fractions of power, which in conjunction with the adjustment of the gain of the remote amplifier 7 can be used to optimise system performance.

In the apparatus of FIG. 4c which corresponds to that of FIG. 3a, there is provided a remote optical sub-assembly including separate paths for the probe pulses and the signals returning from the section of interest 60 which is connected to the instrumentation through separate fibres 50a and 50b, and to the section of interest 60 via a single circulator 13. Not shown in FIG. 4c are the couplers required in the remote sub-assembly 71 to remove the residual power in 11a, the amplifier connected to 50a, and then couple this power into the second amplifier 11b. Optionally pump-reflecting filters can be provided to improve the usage of the pump power. Coupler 8 may be inserted into fibre section 50b, rather than 50a as shown in FIG. 4c.

Figure 4D:
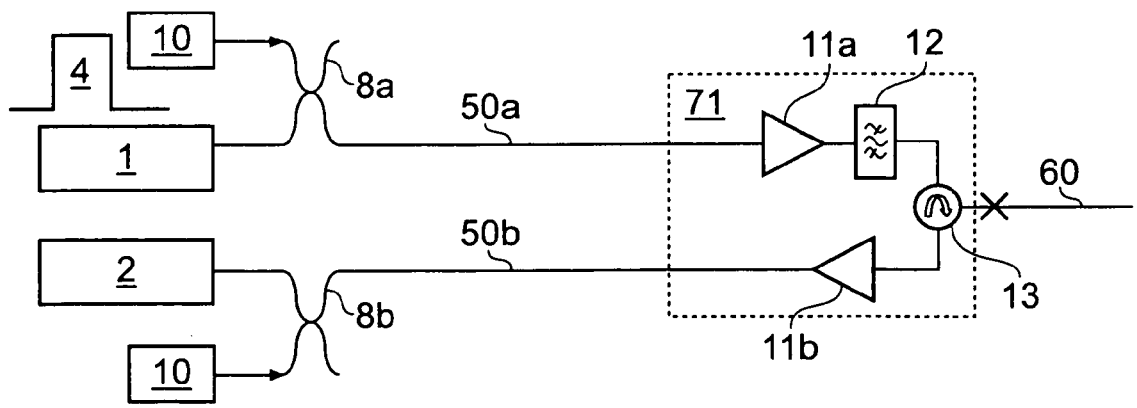
FIG. 4d shows OTDR apparatus according to a fifth embodiment of a second aspect of the present invention.

Alternatively, pump power can be conveyed independently along each of fibres 50a and 50b as illustrated in FIG. 4d. In this case, the pump power 10 is coupled into both fibre 50a and fibre 50b through separate wavelength-selective coupling devices 8a and 8b. The relative pump may be adjusted to adjust the relative gains of the power in each of the amplifiers 11a and 11b. In the case of FIG. 4d, the remote sub-assembly is simplified since no wavelength selective couplers are required to route the pump power between the amplifiers 11a, 11b, which will improve the reliability of the sub-assembly. A further simplification may be gained by replacing the single circulator 13 with a fused taper coupler (not shown). In the case of a fused taper coupler, the overall efficiency can be very high by arranging for an asymmetric splitting ratio, such as 90%/10%, in favour of the signals returning from section 60. Although the probe pulses are launched inefficiently in this arrangement, the availability of a local amplifier allows their power to be increased to compensate and the peak power launched can still be limited by non-linear effects in section 60.

What is claimed is:

1. Optical time domain reflectometry apparatus, for sensing a parameter to be measured in a region of interest, which apparatus comprises: an optical fibre; source means operable to launch optical radiation into the optical fibre at a probe wavelength; and detection means operable to produce electrical output signals in response to optical radiation backscattered from the optical fibre; characterised in that the optical fibre comprises a first section, into which the optical radiation at the probe wavelength is launched, and a second section deployed in the region of interest, the first section having a higher intensity threshold for the onset of non-linear effects than the second section, the said source means being operable to launch optical radiation at the probe wavelength into the first section at an intensity lower than the non-linear effects intensity threshold of the first section but higher than the non-linear effects intensity threshold of the second section, the attenuation characteristics of the first section being chosen such that the intensity of the optical radiation at the probe wavelength reaching the second section is below the threshold for the onset of non-linear effects of the second section.

2. An optical time domain reflectometry method of sensing a parameter to be measured in a region of interest, which method comprises launching optical radiation at a probe wavelength into an optical fibre and producing electrical output signals in response to optical radiation backscattered from the optical fibre, characterised in that the optical fibre comprises first and second sections, the second section having a lower intensity threshold for the onset of non-linear effects than the first section, the second section being deployed in the region of interest and optical radiation at the probe wavelength being launched into the first section at an intensity lower than the non-linear effects intensity threshold of the first section but higher than the non-linear effects intensity threshold of the second section, the attenuation characteristics of the first section being chosen so that the intensity of the optical radiation at the probe wavelength reaching the second section is below that of the non-linear effects intensity threshold of the second section.

3. A method as claimed in claim 2, wherein attenuation of optical radiation at the probe wavelength in the first section is proportional to the length of the first section.

4. A method as claimed in claim 2 or 3, wherein adjacent to the second section an effective area $A_{\text{eff}}$ of the first section decreases towards an effective area $A_{\text{eff}}$ of the second section.

5. A method as claimed in claim 4, wherein the decrease in the effective area of the first section is gradual.

6. A method as claimed in claim 4, wherein the decrease in the effective area of the first section takes place in two or more steps.

7. A method as claimed in claim 6, wherein, for a fibre consisting of i sections of fibre having a progressively decreasing effective areas, given a known ratio in the backscatter level in the ith and (i+1)th sections and the attenuation per unit length of the (i+1)th section, the optimum length $Lopt_{i+1}$ of the (i+1)th section is given by:

$$Lopt_{i+1} = \frac{10 \cdot \log\left[\frac{B_{i+1}}{B_i} \cdot \frac{\alpha_{s_{i+1}}}{\alpha_{s_i}}\right] - S_{i,i+1}}{\alpha_{i+1}}$$

where B is the backscatter capture faction, $\alpha$ is the scattering loss for the spectral component of interest, S is the splicing loss in dB between section i and section i+1 and $\alpha$ is the total loss of the section in dB/km, and assuming $Lopt_{i+1}$ is less than the length of the region of interest and the intensity of the radiation at the junction between the i and (i+1)th sections is below the non-linear effects intensity threshold of the (i+1)th section.

* * * * *